(12) United States Patent
Hoose

(10) Patent No.: US 6,371,263 B1
(45) Date of Patent: Apr. 16, 2002

(54) VEHICLE AND VEHICLE SUSPENSION

(76) Inventor: Howard Hoose, Onequethaw Creek Rd., Feura Bush, NY (US) 12067

( * ) Notice: Subject to any disclaimer, the term of this patent is extended or adjusted under 35 U.S.C. 154(b) by 0 days.

(21) Appl. No.: 09/421,579

(22) Filed: Oct. 20, 1999

Related U.S. Application Data

(63) Continuation-in-part of application No. 08/848,517, filed on Apr. 28, 1997.

(51) Int. Cl.[7] .................................................. F16F 9/00
(52) U.S. Cl. ...................................... 188/312; 280/276
(58) Field of Search ................................. 188/287, 269, 188/314, 312, 322.17; 280/276, 279; 267/64.26, 225, 221

(56) References Cited

U.S. PATENT DOCUMENTS

| | | | |
|---|---|---|---|
| 1,918,697 A | | 7/1933 | Gruss |
| 2,173,574 A | * | 9/1939 | Binder et al. ................ 188/314 |
| 2,917,303 A | * | 12/1959 | Vierling ........................... 267/8 |
| 3,439,499 A | | 4/1969 | Stratford |
| 3,854,710 A | | 12/1974 | Nicholls |
| 3,874,485 A | * | 4/1975 | Smith ........................... 188/314 |
| 4,057,264 A | * | 11/1977 | Suzuki et al. ................ 280/276 |
| 4,177,977 A | * | 12/1979 | Sekiguchi et al. ......... 267/64 R |
| 4,182,441 A | | 1/1980 | Strong et al. |
| 4,337,849 A | * | 7/1982 | Siorek et al. ................. 188/276 |
| 4,381,857 A | * | 5/1983 | Cook ........................ 267/64.15 |
| 4,433,850 A | | 2/1984 | Miyakoshi et al. |
| 4,531,755 A | | 7/1985 | Isono et al. |
| 4,593,890 A | | 6/1986 | van der Laarse |
| 4,815,763 A | | 3/1989 | Hartmann |
| 4,896,866 A | * | 1/1990 | Legrand et al. .......... 267/64.26 |
| 4,915,364 A | * | 4/1990 | Perlini ...................... 267/64.26 |
| 5,024,465 A | * | 6/1991 | Baiker ......................... 280/840 |
| 5,088,705 A | | 2/1992 | Tsai |
| 5,201,244 A | | 4/1993 | Stewart et al. |
| 5,224,689 A | * | 7/1993 | Georgiev ..................... 267/225 |
| 5,228,640 A | * | 7/1993 | Mouille ..................... 244/17.27 |
| 5,242,157 A | * | 9/1993 | Bonenberger et al. ... 267/64.26 |
| 5,529,519 A | * | 6/1996 | Nakamura et al. ............ 440/61 |
| 5,593,007 A | * | 1/1997 | Siltannen ..................... 188/314 |
| 5,725,226 A | | 3/1998 | Cabreizo-Pariente |
| 5,779,007 A | * | 7/1998 | Warinner ..................... 188/314 |
| 6,042,091 A | * | 3/2000 | Marzocchi et al. ....... 267/64.15 |
| 6,109,400 A | * | 8/2000 | Ayyildiz et al. .......... 188/266.1 |
| 6,161,821 A | * | 12/2000 | Leno et al. ............... 267/64.24 |
| 6,244,609 B1 | | 6/2001 | Wilson |

FOREIGN PATENT DOCUMENTS

| | | | | |
|---|---|---|---|---|
| DE | 2229945 | | 6/1972 | |
| EP | 3-458 B1 | * | 8/1979 | .............. 267/64.26 |

* cited by examiner

Primary Examiner—Christopher P. Schwartz
Assistant Examiner—Benjamin A Pezzlo
(74) Attorney, Agent, or Firm—Hoffman, Warnick & D'Alessandro LLC; Spencer K. Warnick

(57) ABSTRACT

A vehicle and vehicle suspension including a number of shock chambers to provide different levels of incrementally increasing shock absorption/cushioning. The suspension includes a shock tube having a first end and a second end; a first member telescopically receiving the first end of the shock tube; a first piston coupled to the first member and sealingly received in the first end of the shock tube; a second member telescopically receiving the second end of the shock tube; and a second piston coupled to the second member and sealingly received in the second end of the shock tube. The first and second pistons form at least one shock tube sealed chamber in the shock tube, and the first member and second member are distanced from one another by the shock tube.

12 Claims, 8 Drawing Sheets

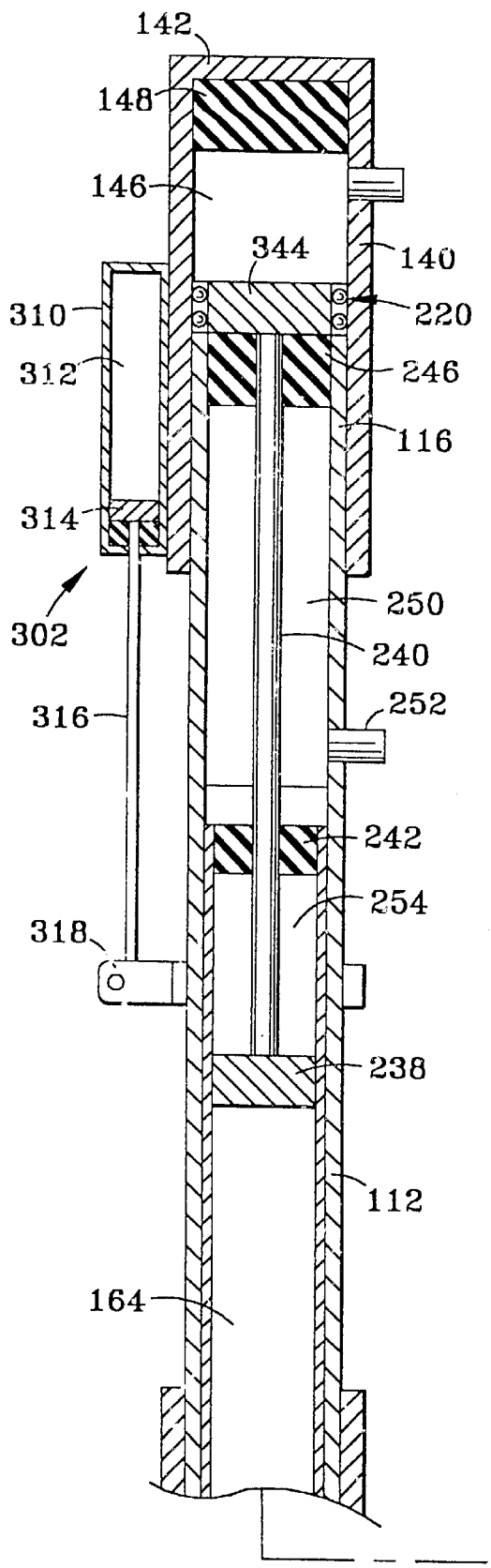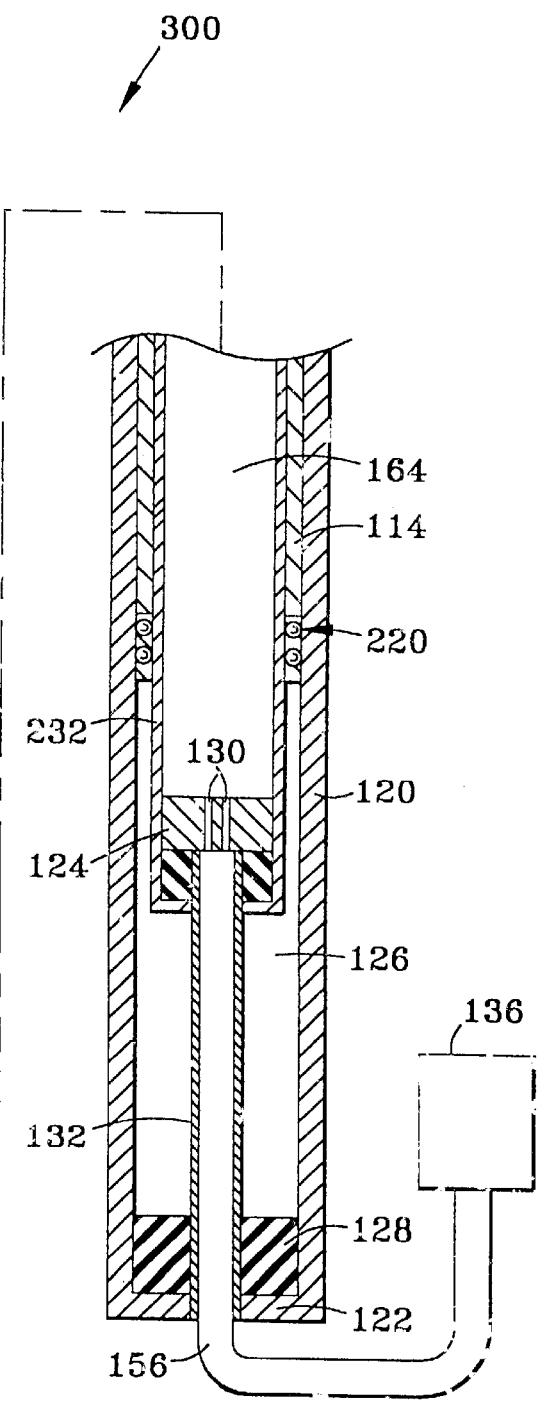
FIG. 12

VEHICLE AND VEHICLE SUSPENSION

This application is a continuation-in-part application of U.S. Ser. No. 08/848,517, filed Apr. 28, 1997 currently issued.

BACKGROUND OF THE INVENTION

1. Technical Field

The present invention relates generally to a suspension for a two-wheeled vehicle and the two-wheeled vehicle with such a suspension. More particularly, the present invention relates to a two-wheeled vehicle suspension having two shock absorbing systems independently operable between a two-wheeled vehicle's frame and wheel.

Furthermore, the invention relates to a suspension having numerous shock absorbing sections to provide incrementally increased shock absorption/cushioning, if desired.

2. Related Art

Heretofore, the related art has provided two wheeled vehicle suspensions, e.g., motorcycle or bicycle suspensions, containing only one shock absorbing member between the steering column and wheel. While these suspensions have been generally satisfactory, when rough terrain is encountered, the suspensions are limited to the stroke of the single shock absorber. Accordingly, once the single shock absorber has "bottomed out", the rider is subjected to direct transmittal of the ground undulations.

SUMMARY OF THE INVENTION

It is an advantage of the present invention to overcome the above mentioned deficiencies in the related art. In order to achieve this, the present invention provides, in a first embodiment, a wheel suspension including: at least one elongate member having a first end and second end, a first shock absorber connected to the first end of the elongate member and a second shock absorber connected to the second end of the elongate member such that the first and second shock absorber act independently. As a result, the suspension can operate to cushion the ride with two shock absorbers that may be set to the same pressure or different pressures according to the operator's liking.

A further feature of the present invention is found in how the teachings of the present invention can be advantageously applied to a forked suspension of any wheeled vehicle and, in particular, any two-wheeled vehicle, e.g., a motorcycle or bicycle. When used on a two wheeled vehicle, the suspension members may be used to form a front fork such that the first shock absorber is attached to the steering column via a steering column frame and to the forks of the suspension. Through the shock absorber and fork connection, the structure adds further rigidity to the suspension, hence, preventing twisting of the forks when used to steer the vehicle.

Another advantage of the present invention is the selectability of the shock absorber members. For instance, hydraulic piston/cylinder system, a pneumatic piston/cylinder system, or a spring-based system, are all equally applicable within the scope of the present invention.

A further feature of the present invention is its capability to be retrofitted to older vehicles.

In order to further achieve the stated advantages, in a second embodiment, the present invention includes a suspension for a vehicle comprising a shock tube having a first end and a second end; a first member telescopically receiving the first end of the shock tube; a first piston coupled to the first member and sealingly received in the first end of the shock tube to form a first member sealed chamber; a second member telescopically receiving the second end of the shock tube; a second piston coupled to the second member and sealingly received in the second end of the shock tube to form a second member sealed chamber; and wherein the first and second pistons also form at least one shock tube sealed chamber in the shock tube. This embodiment provides a suspension that can operate to cushion the ride with up to four different levels of shock absorption in one suspension. The different shock absorbers may be set to the same pressure or different pressures to provide incrementally increasing shock absorption according to the operator's liking. The second embodiment also includes a vehicle incorporating the above suspension.

The above-described embodiment can be modified to provide further levels of shock absorption by providing: a first shock tube having a first end and a second end; a second shock tube telescopically and sealingly received in the first shock tube, the second shock tube having a first end and a second end; a first housing telescopically and sealingly receiving the first end of the first shock tube to form a first shock chamber; a first piston coupled to the first housing and sealingly received in the first end of the second shock tube; an intermediate piston fixedly mounted relative to the first shock tube by an intermediate piston positioner, the intermediate piston extending into the second end of the second shock tube to form a second shock chamber with the first piston; a second housing telescopically and sealingly receiving the second end of the first shock tube. This embodiment provides a suspension capable of more levels of incrementally increasing shock absorption/cushioning, if desired.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein:

FIG. 12 shows a cross-section view of another embodiment of the suspension of FIG. 9.

DESCRIPTION OF THE PREFERRED EMBODIMENTS

While the present invention will be described in conjunction with a two wheeled vehicle, e.g., a motorcycle or bicycle, it should be noted as self-evident that the invention may be utilized in a variety of vehicle suspensions not illustrated herein. Furthermore, while embodiments of the invention are illustrated for use with one of a front fork or rear suspension of a two-wheeled vehicle, it should be noted that the inventions are equally applicable to either the front or rear suspension of a vehicle.

Figure 1:
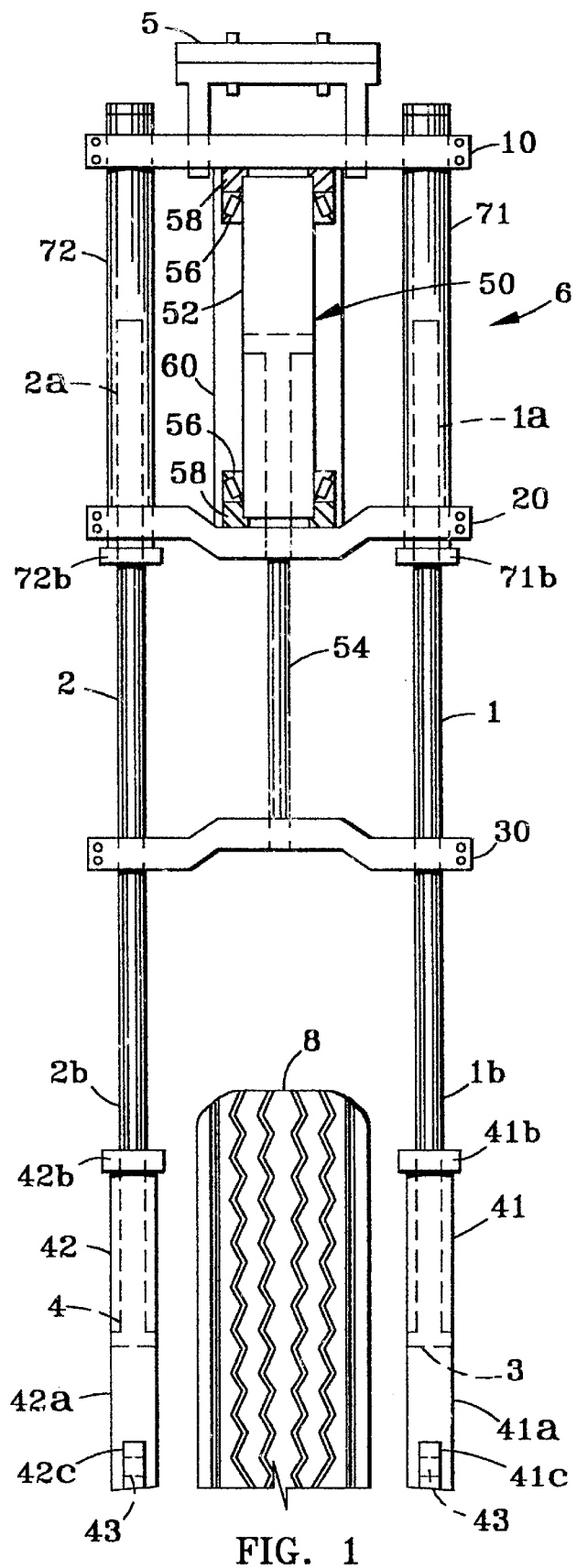
FIG. 1 shows a front view of a suspension in accordance with the present invention.

FIG. 1 shows a front view of the wheel suspension in accordance with the present invention. The suspension includes a pair of elongate members 1, 2, which act as a forked suspension, for example, for a motorcycle or bicycle. The elongate members 1, 2 may be constructed as solid rods or tubular members, and are 5 conventionally formed of tempered steel.

At the lower ends 1b, 2b of each of the elongate members 1, 2, a lower shock absorber 41, 42 is provided. Each of the lower shock absorbers 41, 42 include a sleeve 41a,42a which telescopically receive the lower ends 1b, 2b of the elongate members 1, 2. The sleeves 41a,42a each include a seal 41b, 42b, which seal the lower ends 1b, 2b of the elongate members inside the sleeves 41a,42b. The lower ends of the sleeves 41a,42a are also sealed, for example, by a plate welded to close off their lower openings.

To form a shock absorber, the lower ends 1b, 2b of the elongate members may include pistons 3, 4. In this way, the elongate members 1, 2 and sleeves 41, 42 form a sealed shock absorber when pressurized fluids, e.g. air or hydraulic fluid, are injected in the chambers formed between the pistons 3, 4 and the ends of the sleeves 41, 42. The resulting system is commonly referred to as a pneumatic piston/cylinder system or a hydraulic piston/cylinder system depending on the fluid used. As will be readily recognized by one having ordinary skill in the art, the chambers of the systems may be connected for fluid communication to reservoirs of pressurized fluid (not shown) for adjustability.

Figure 7:
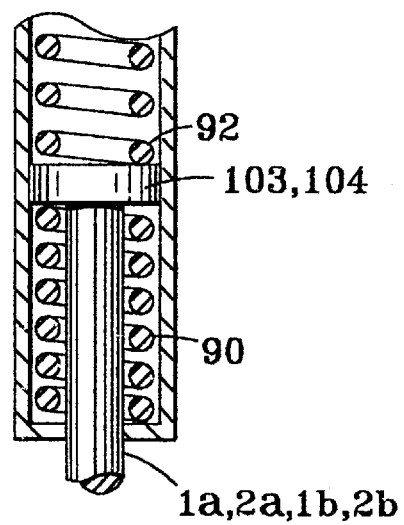
FIG. 7 shows a cross-sectional view of a spring-based shock absorber in accordance with an alternative embodiment of the present invention.
Figure 8:
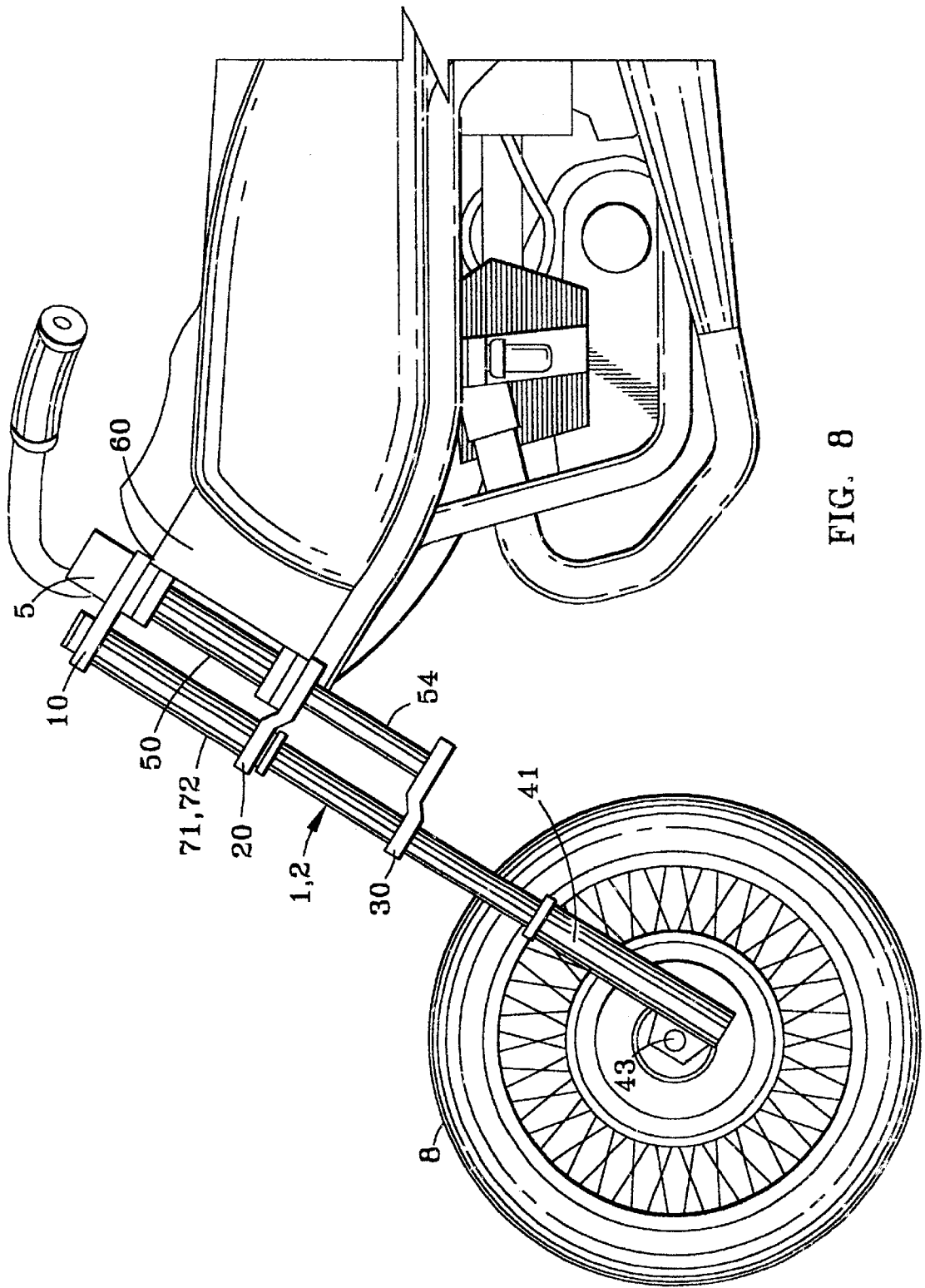
FIG. 8 shows a vehicle incorporating the suspension in accordance with FIG. 1.

Alternatively, as shown in FIG. 7, the lower shocks 41, 42 may be created by a spring-based system. In this alternative embodiment, a spring 90 is placed below the piston 103, 104 and a spring 92 is placed above the piston 103, 4 to form a bi-directional cushion.

At a lowermost portion of the shock absorber sleeves 41a, 42a, plates 41c, 42c are fixedly attached. The plates 41c, 42c include aligned apertures 43 therethrough to support an axle of a vehicle-supporting wheel 8. Hence, as the wheel travels along its path, the shock absorbers 41, 42 absorb the undulations to prevent transmittal of the shocks up the elongate members 1, 2.

When the suspension is used on a front of a two wheeled vehicle it is necessary for the suspension to provide steering. In order to provide steerability, at the upper ends 1a, 2a of the elongate members, a steering frame 6 is provided. The steering frame 6 includes a pair of sleeves 71, 72 which telescopically receive the upper ends 1a, 2a of the elongate members 1, 2. The sleeves 71, 72 are fixedly attached by a pair of triple clamps 10, 20.

Figure 2:
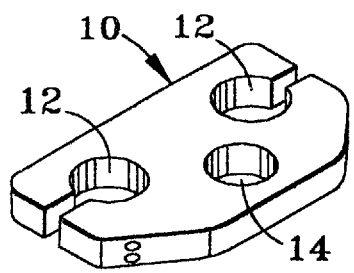
FIG. 2 shows an isometric view of a suspension component in accordance with the present invention.

FIG. 2 shows triple clamp 10. The plate 10 includes a pair of generally circular openings 12 with slots therein for changing the size of the apertures by tightening or loosening of at least one adjustable fastener (not shown). The clamp 10 also includes an aperture 14 positioned centrally in the plate but non-collinearly with the apertures 12. In accordance with the present invention, as shown in FIG. 1, the upper portions of sleeves 71, 72 are positioned in the apertures 12 and fixedly attached by tightening of the adjustable fastener.

Figure 3:
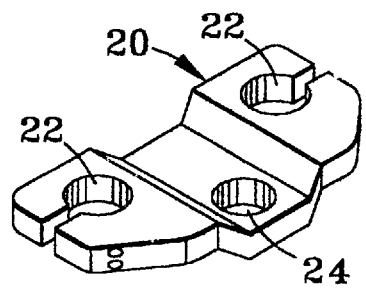
FIG. 3 shows an isometric view of a second suspension component in accordance with the present invention.

FIG. 3 shows the triple clamp 20, which is provided as a "dove-wing" triple clamp. The clamp 20 is formed of a cast or bent steel or aluminum plate with two co-planar outer sections and an intermediate-lowered section. The clamp 20, similarly to clamp 10, includes a pair of adjustably sized apertures 22 through which the lower portions of sleeves 71, 72 are fixedly positioned by tightening of at least one adjustable fastener (not shown). The triple clamp 20 also includes an aperture 24 positioned centrally but non-collinearly with respect to apertures 22.

Figure 4:
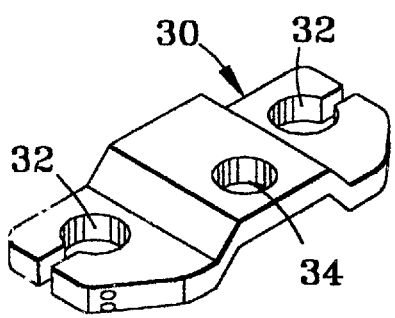
FIG. 4 shows an isometric view of third suspension component in accordance with the present invention.

FIG. 4 shows a third triple clamp 30 that is not a part of the steering frame 6 but is discussed here for clarity. The third triple clamp 30 is similar to the "dove wing" triple clamp 20 except that the intermediate section is now raised from the side sections. The third triple clamp 30 includes two adjustably sized apertures 32 and a central aperture 34, which is non-collinear with apertures 32. The significance of the third triple clamp will be discussed below.

With regard to all of the triple clamps, while some are shown as bent or cast clamps with raised or lowered central areas, it should be noted that flat or bent/cast triple clamps can be used throughout the device. In the embodiment shown in FIG. 1, the bent triple clamps are provided to accommodate a shock absorber 50, discussed below. Accordingly, depending on the size of the shock absorber 50 used, a variety of differently bent/cast or flat triple clamps may be used without departing from the scope of this invention. The triple clamps are composed of a steel or aluminum.

In order to provide upper shock absorption, a variety of shock absorbing members may be provided. First, the sleeves 71, 72 may be closed off at their upper ends, e.g., a plate welded across their upper openings. Furthermore, similarly to the lower shock absorber, the sleeves 71, 72 may be sealed off by seals 71b, 72b so as to form a shock absorbing chamber with the upper ends 1a, 2a of the elongate members 1, 2. The sealed chambers so created can be filled with a pressurized fluid, e.g. air or hydraulic fluid, and connected to pressurized fluid reservoirs if desired. Alternatively, as shown in FIG. 7, the upper ends 1a, 2a of the elongate members can be provided with pistons 103, 104 to provide a dual direction spring-based shock absorbing system via springs 90 and 92, as discussed above.

Second, in addition to or replacement of the shock absorbing system created by the sleeves 71, 72 and the upper ends 1a, 2a of the elongate member 1, 2, an upper shock absorber 50 is provided within the steering frame 6. In the alternative that the shock absorber 50 is the only shock absorption system to be used, the sleeves 71, 72 may be open, non-shock absorbing systems. The shock absorber 50 is provided as a: hydraulic piston/cylinder system, pneumatic piston/cylinder system or spring-based system.

When the shock absorption is provided by sealed sleeves 71, 72 alone, steering is provided by a conventional steering stem (not shown) located in the central openings 14, 24 of the triple clamps 10, 20, respectively. The bearing being connected to the vehicle frame 60 with the upper triple clamp 10 including a handle bar clamp 5 for a handle (not shown) for steering of the steering frame 6 and entire suspension by an operator. However, when the upper shock absorber 50, as shown in FIG. 1, is provided, the steering stem or shaft is not used. Accordingly, in accordance with the present invention, the upper shock absorber 50 is constructed in such a way as to accommodate shock absorption for motion of the elongate members 1, 2 and steerability of the steering frame 6 and the entire suspension.

In order to provide shock absorption, an upper end (e.g., an uppermost end of a cylinder end of a piston/cylinder system) of the upper shock absorber 50 is attached to the center aperture 14 of the upper triple clamp 10. The lower end (e.g., a rod 54 end of the piston/cylinder system) of the upper shock absorber 50 is attached to the center aperture 34 of the third triple clamp 30. Furthermore, an intermediate portion (e.g., a lowermost end of a cylinder end of a piston/cylinder system) is attached to the second triple clamp 20 such that the rod 54 of the piston/cylinder system is movable freely through the center aperture 24 of the triple clamp 20.

As will be evident to one having ordinary skill in the art, the upper shock absorber 50 can also be reversed, i.e., such that the cylinder of the upper shock absorber 50 is attached to the third triple clamp 30 and the rod 54 is fixed to the second triple clamp 20 and the upper triple clamp 10.

In order to provide steering of the vehicle, the upper shock absorber 50 is connected to the vehicle frame 60 with a pair of spaced tapered roller bearings (e.g., Timkin@ bearings) 56, which allow rotational movement of upper shock absorber 50, and hence the steering frame and entire suspension, relative to the vehicle frame 60. A handle bar can be attached to the steering frame 6 by a handle bar clamp 5 attached to the upper triple clamp 10. Accordingly, an operator of the vehicle can steer the suspension by turning of the handle bar (not shown) to turn the steering frame and the entire suspension about the bearings 56. Bearing seals 58 may also be provided between the bearings 56 and triple clamps 10, 20.

Figure 5:
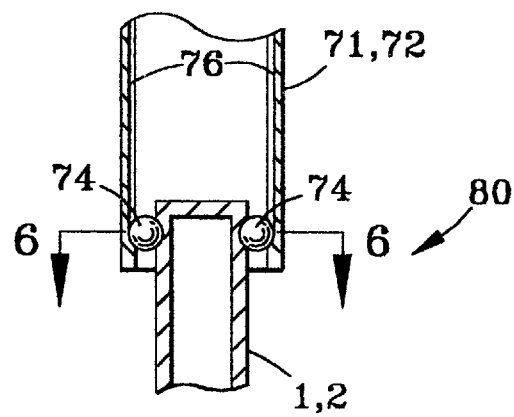
FIG. 5 shows a partial cross-sectional view of an alternative embodiment for a component of the suspension in accordance with the present invention.
Figure 6:
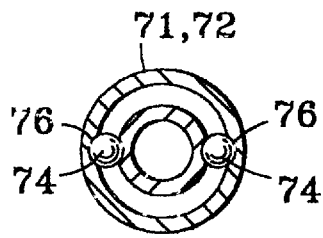
FIG. 6 shows a cross-sectional view 6—6 of the FIG. 5 component.

FIGS. 5 and 6 show an alternative embodiment for the sleeves' 71, 72 and elongate members' 1, 2 telescopic connections. In this alternative, to aid in the sliding action, a bearing 80 is provided between the sleeves 71, 72 and elonaate members 1, 2. In particular, the sleeves 71, 72 are constructed to receive ball bearings 74 in a pair of slots 76 formed on an interior thereof. The ball bearings 74 are rotatably encapsulated in the outer periphery of elongate members 1, 2 such that they can rotate between the elongate members 1, 2 and sleeves 71, 72 when the elongate members move within the sleeves 71, 72. Hence, the ball bearings 74 and slots 76 guide and aid in the sliding motion of the elongate members 1, 2 within the sleeves 71, 72. The chamber is sealed such that any fluid provided in the chamber does not escape by a seal (not shown).

In operation, the lower shock absorber 41, 42 and upper shock absorber 50 and/or 71, 72 absorb shock on the vehicle caused by terrain being covered. The upper and lower shock absorbers can be set to different compression forces so that when one shock absorber reaches maximum absorption, e.g., "bottoms out", the other shock absorber can take over at a higher compression. Alternatively, the shock absorber sets can be set at substantially the same compression such that the sets act independently but tend to react symmetrically.

Figure 9:
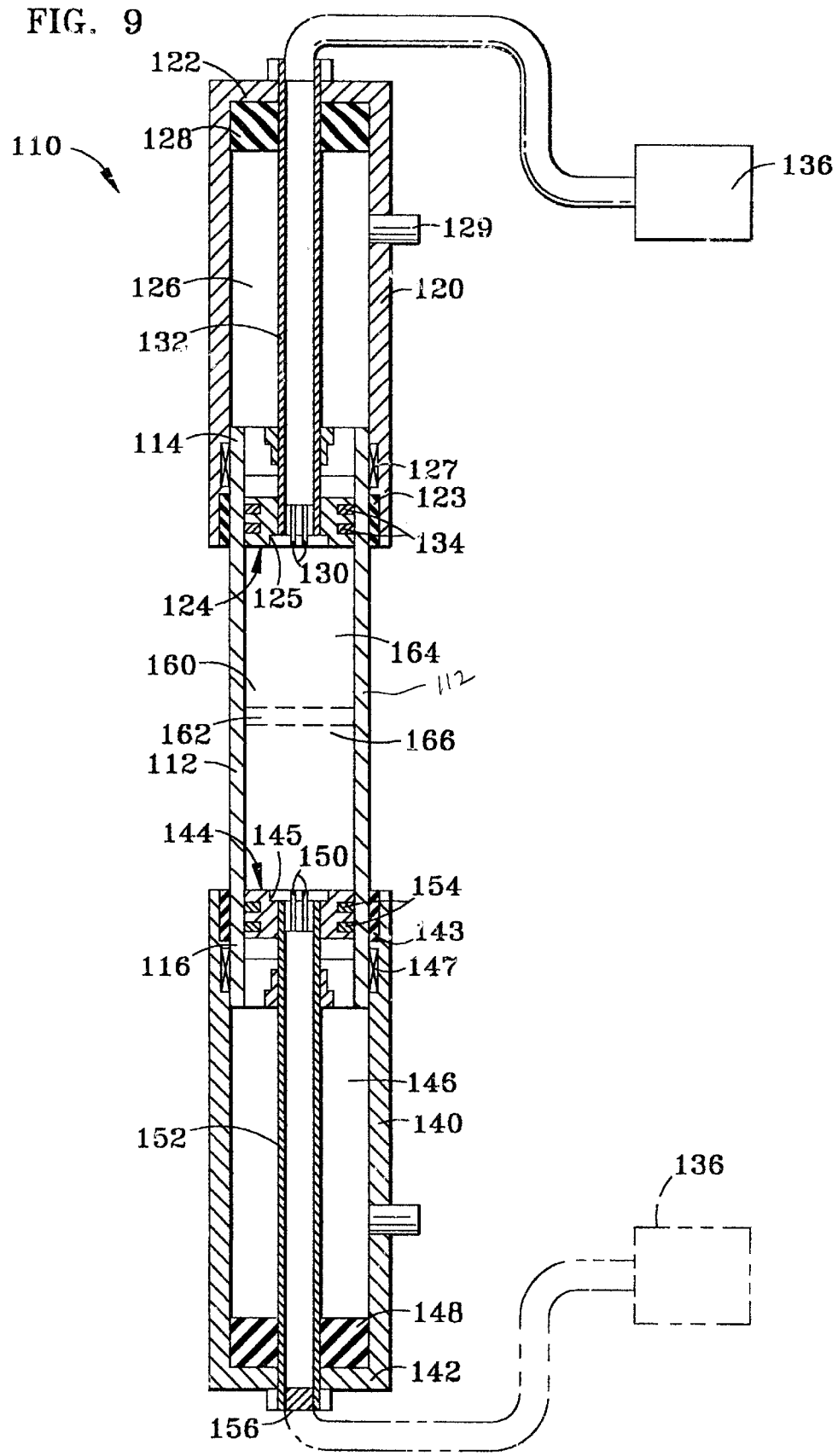
FIG. 9 shows a cross-sectional view of a suspension in accordance with a second embodiment of the present invention.
Figure 10:
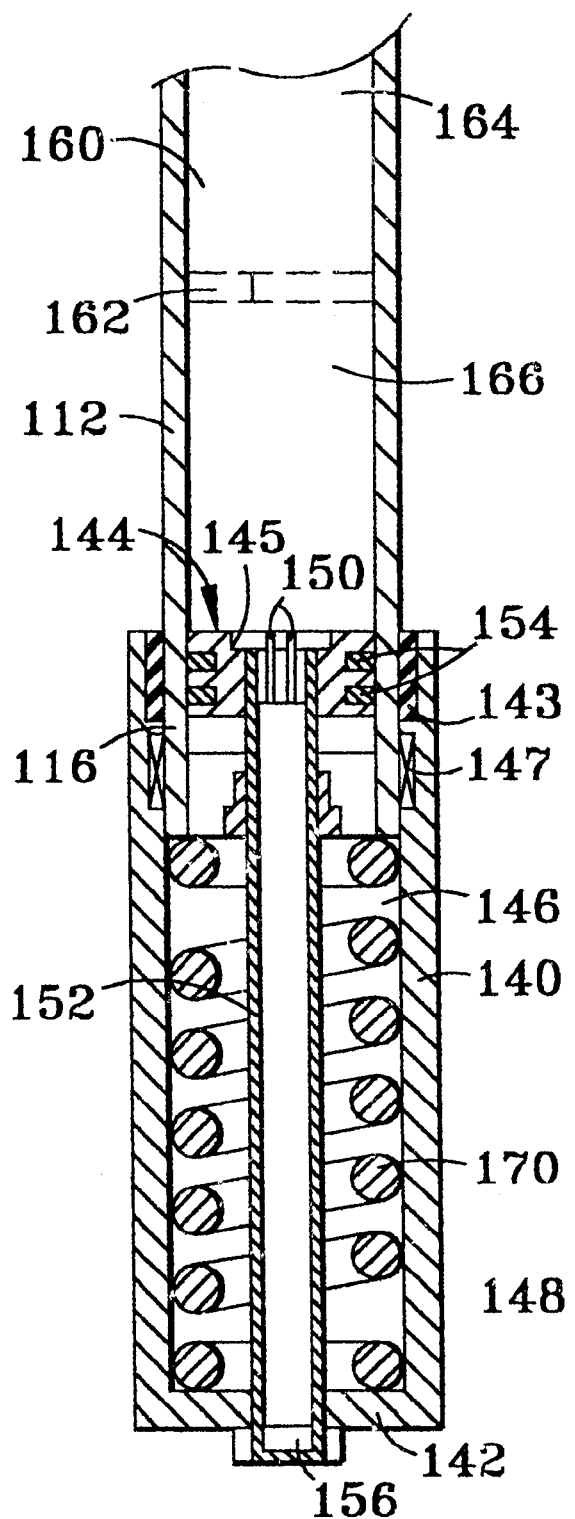
FIG. 10 shows a cross-section view of the suspension of FIG. 9 with an alternative spring.

Referring to FIGS. 9–10, a second embodiment of a suspension 110 of the present invention is disclosed. As shown in FIG. 9, suspension 110 includes a shock tube 112 having a first end 114 and a second end 116. First end 114 is telescopically received in a first member or housing 120. Second end 116 is telescopically received in a second member or housing 140. First housing 120 and second housing 140 are preferably tubular members having closed ends 122, 142, respectively. Housings 120, 140 are distanced from one another by shock tube 112. First housing 120 and second housing 140 each include a seal 123, 143, respectively, to seal against shock tube 112 and a bearing 127, 147, respectively, to aid slidability with shock tube 112. These seals allow suspension 110 to operate without the need for a rubber boot to protect suspension 110 from debris.

Coupled with first housing 120 is a first piston 124. Piston 124 is sealingly received in first end 114 of shock tube 112 by piston rings 134. The positioning of seals 123 in housing 120 and piston rings 134 in piston 124 allow shock tube 112 to slide and maintain a first sealed shock chamber 126 in first housing 120. With regard to the term "shock chamber" or "sealed shock chamber," as used herein, the terms mean any suspension chamber capable of either being sealed to contain a fluid to absorb shock or receiving a spring or spring system to absorb shock.

Shock chamber 126 can be advantageously pneumatically pressurized, e.g., by valve 129, to absorb shock encountered by suspension 110. Preferably pressurization is pneumatically provided although other readily recognized mechanisms exist, e.g., oil, springs, etc. First housing 120 preferably includes a polymer bumper 128 to cushion first end 114 of shock tube 112 during bottoming out of suspension 110. Similar to first housing 120, second housing 140 includes a second piston 144 sealingly received in second end 116 forming a second sealed shock chamber 146, and a polymer bumper 148. Shock chamber 146 is pressurized similarly to chamber 126.

As an alternative, as shown in FIG. 10, chambers 126, 146 (only 146 of which is shown) may each include a compression spring 170 which abuts ends 114, 116 of shock tube 112 and is compressed against closed ends 122, 142. In this setting, bumpers 128, 148 may be removed.

Regardless of whether pressurized fluid or a compression spring 170 are used, it is an advantage of suspension 110 to provide different levels of cushioning or staged cushioning. Different levels of cushioning or staged cushioning means when one part of the suspension has met its load limit, another part takes over. In other words, one part of suspension 110 absorbs shock at a different level than another part and, hence, suspension 110 provides incrementally increasing shock absorption or cushioning. For instance, one compression spring 170 may have a compression level of 80 pounds while that of another compression spring 170 my have a compression level of 120 pounds.

Returning to FIG. 9, pistons 124, 144 also form a sealed shock chamber 160 in shock tube 112. Each piston 124, 144 includes a head portion 125, 145 and a stem portion 132, 152, respectively. In head portions 125, 145, piston rings 134, 154 are provided to seal pistons 124, 144 to shock tube 112. Also provided in head portions 125, 145 are restricted orifices 130, 150. Stem portions 132, 152 are hollow tubes that extend from head portions 125, 145 through closed ends 122, 142 of first housing 120 and second housing 140, respectively. In order to pressurize chamber 160, one of stem portions, e.g. 132, is fluidly coupled to a source of pressurized fluid 136 such as an accumulator. The other stem portion 152 is sealed by a cap 156.

Restricted orifices 130 restrict flow of fluid from sealed chamber 160 through head portion 125 and stem portion 132 to source of pressurized fluid 136 as suspension 110 absorbs shock. Pressurized fluid communicated to shock chamber 160 provides cushioning in conjunction with restricted orifices 130 and source of pressurized fluid 136. The pressurized fluid is preferably an oil, but other fluids are possible, e.g., air. Through this structure, suspension 110 provides potentially three levels of cushioning via shock chambers 126, 146 and 160.

As an alternative, sealed chamber 160 may include a division wall 162 to create two sealed shock chambers 164, 166 in shock tube 112. In this case, cap 156 is removed and stem portion 152 is fluidly coupled to a source of pressurized fluid 136, e.g., an accumulator (shown in phantom), so that chamber 166 can provide cushioning. Similar to piston head 125, head portion 145 includes restricted orifices 150 that restrict flow of fluid from sealed chamber 166 through head portion 145 and stem portion 152 to source of pressurized fluid 136. On the other side of division wall 162, chamber 164 works in an identical fashion. Through this structure, four levels of shock absorption via shock chambers 126, 146, 164, 166 are possible in suspension 110. The fluid, preferably oil, in sealed chambers 164, 166 can be set at different pressures to provide different levels of absorption. Similarly, the fluid or spring in chambers 126, 146 may be pressurized at different pressures/compression rates to provide staged cushioning as discussed above.

Figure 11:
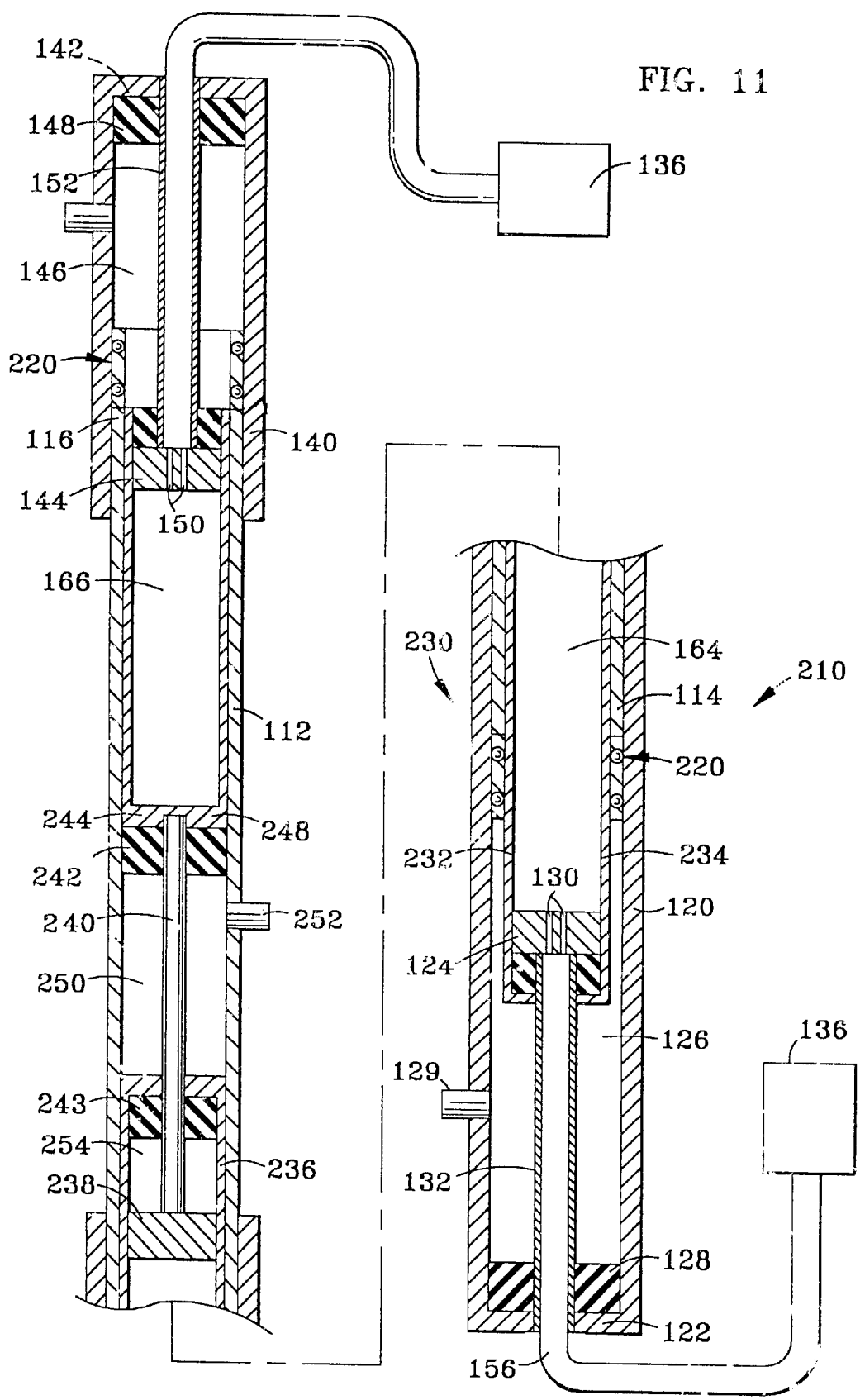
FIG. 11 shows a cross-section view of another embodiment of the suspension of FIG. 9.

Referring to FIG. 11, a third embodiment of the invention is illustrated. For illustration purposes, structure described with regard to FIG. 9 will continue to be referenced the same except where such structure has been duplicated in this embodiment. In that case, FIG. 9 structure will be referred to as "first" and where duplicated in this embodiment as "second, third, fourth," etc. As shown in FIG. 11, an intermediate shock tube system 230 is interposed in first shock tube 112. Intermediate shock tube system 230 provides additional levels of shock absorption by providing more shock chambers as will be described below.

Intermediate shock tube system 230 includes an intermediate or second shock tube 232 having a first end 234 and a second end 236; an intermediate piston 238 with a stem 240; an intermediate polymer bumper 242; and an intermediate piston positioner 244. Intermediate shock tube 232 is telescopically received and slidably movable within first shock tube 112. First shock tube 112 is guided within first housing 120 by a bearing and seal system 220. Bearing and seal system 220 includes a rolling bearing exterior that guides shock tube 220 within first housing 120 and a sealing interior that seals against intermediate shock tube 232. A bearing and seal system 220 may also be included at second end 116 of shock tube 112 to guide shock tube 112 within second housing 140. In this case, however, the interior of system 220 would not seal against shock tube 112 as will be explained below.

First end 234 of intermediate shock tube 232 extends outwardly from first shock tube 112 to receive first piston 124 and seal against stem 132. Second end 236 of intermediate shock tube 232ends within first shock tube 112, receives intermediate piston 238 and seals against stem 240. Second end 236 of intermediate shock tube 232 is preferably cushioned during bottoming out by intermediate polmer bumper 242 within first shock tube 112. Another polymer bumper 243 may also be provided within second end 236 of intermediate shock tube 232 to cushion intermediate piston 238 relative to intermediate shock tube 232.

Intermediate shock tube system 230 is, in part, positioned within shock tube 112 by an intermediate piston positioner 244. Positioner 244 positions intermediate piston 238 and intermediate polymer bumper 242. Furthermore, as shown in FIG. 11, positioner 244 preferably receives second piston 144 to create shock chamber 166, which functions identical to that describe relative to FIG. 9. That is, either fluid is pressurized within chamber 166 and then sealed, or pressurized fluid is provided by a source of pressurized fluid 136 through hollow stem 152 and restricted orifices 150 to shock chamber 166. It should be recognized, however, that shock chamber 166 may be created within first shock tube 112 in which case positioner 244 can be a simple mounting within first shock tube 112 to position intermediate piston 238 and intermediate polymer bumper 242.

In either scenario, positioner 244 is fixed within shock tube 112 at second end 116 thereof to position stem 240, intermediate piston 238 and intermediate polymer bumper 242 relative to first shock tube 112. Intermediate shock tube 232 with first piston 124 and intermediate piston 238 create shock chamber 164, which functions identical to that described relative to FIG. 9. That is, either fluid is pressurized within chamber 164 and then sealed, or pressurized fluid is provided by a source of pressurized fluid 136 through hollow stem 132 and restricted orifices 130 to shock chamber 166.

It should be recognized that the embodiment of FIG. 11 retains shock chambers 126, 146 within first and second housing 120, 140, respectively, so as to provide more levels of cushioning. The FIG. 11 embodiment, however, also creates another shock chamber 250 between intermediate shock tube 232 and intermediate polymer bumper 242. Shock chamber 250 can be pressurized with fluid via a valve 252 or contain a spring (not shown) to provide further shock absorption/cushioning.

Furthermore, another shock chamber 254 is created between intermediate piston 238 and second end 236 (or polymer bumper 243, if used) of intermediate shock tube 232. Shock chamber 254 can provide cushioning via a spring or fluid pressure.

The above-described embodiment creates a suspension capable of six levels of shock absorption/cushioning, by the use of a first 126, second 164, third 254, fourth 250, fifth 146 and sixth 166 shock chambers. It is preferable that first 126, third 254, fourth 250 and fifth 166 shock chambers are pneumatically pressurized via valves (not shown).

Referring to FIG. 12, another embodiment of the FIG. 11 suspension is illustrated. This suspension 300 retains much of the FIG. 11 structure but removes chamber positioner 244, second piston 144 and related structure, e.g., chamber 166, stem 152, accumulator 136. In replacement, a modified intermediate piston positioner 344 is provided that closes off second end 116 of first shock tube 112 and fixedly positions intermediate piston 238 relative to first shock tube 112. Intermediate piston 238 is telescopically received within intermediate shock tube 232. An intermediate polymer bumper 246 may also be fixed at the second end 116 of shock tube 112. Polymer bumper 148 may be retained to cushion second end 116 of shock tube 112. Intermediate piston 238 is positioned within intermediate shock tube 232 to create chamber 164 with first piston 124. As a result, shock chambers 250 and 254 are present, but chamber 166 is removed.

In order to retain six shock chambers and to allow easier construction and adjustment, an exterior shock absorber 302 is connected to suspension 300. In this setting, a base member or housing 310 having a sealed shock chamber 312 is fixed to an outer surface of second housing 140. Shock chamber 312 can be fluidly pressurized or contain a spring or spring system. Shock aborber 302 also includes a piston 314 that is movable within chamber 310 and a stem 316 that extends to couple to shock tube 112 via a collar connector 318. This embodiment provides the same levels of shock absorption/cushioning of the FIG. 11 embodiment but without the need for piston 144. Furthermore, this embodiment provides easier adjustability because exterior shock absorber 302 is more readily accessible to a user.

Figure 13:
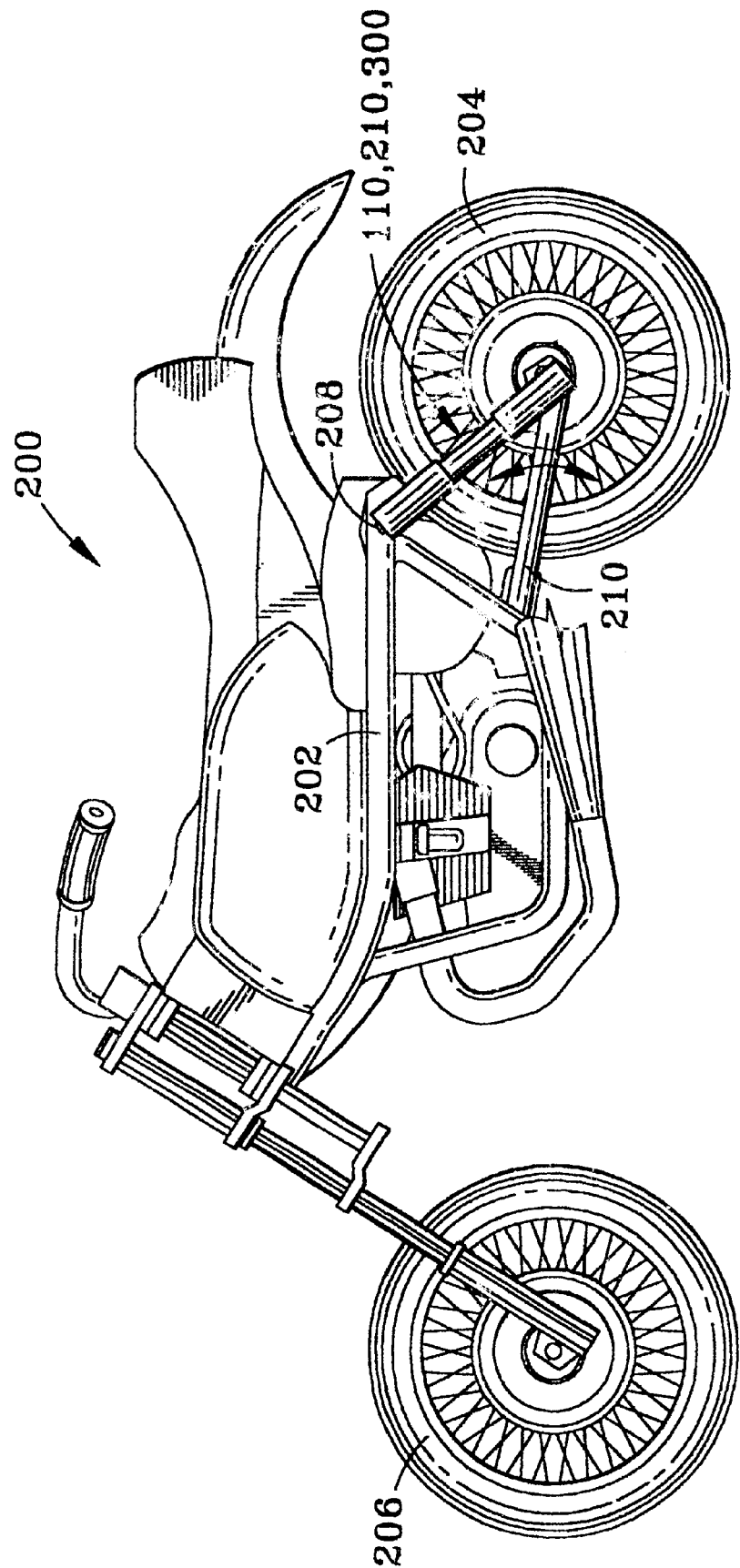
FIG. 13 shows a vehicle incorporating the suspension in accordance with FIGS. 9, 10, 11 or 12.

Referring to FIG. 13, a wheeled vehicle 200 in accordance with the invention is disclosed. Wheeled vehicle 200 includes a vehicle frame 202 having at least one wheel 204, 206. As shown, any of suspensions 110, 210, 300 can be coupled in a conventional manner between a stationary member 208 and a pivotal rocker arm 210 that is coupled to wheel 204. Suspension 110, 210 or 300, hence, cushions the undulations experienced by wheel 204 during movement of vehicle 200.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

In particular, with regard to the first embodiment, while the invention has been described in conjunction with a front fork of a two wheeled vehicle, it is not to be limited to a motorcycle or bicycle suspension. Similarly, while the second embodiment has been described in conjunction with a rear suspension of a two wheeled vehicle, it is not to be limited to such usage. As should be self-evident, the present invention can be utilized on any wheel, front or back, on any vehicle without departing from the general teachings of the invention.

Furthermore, while the first embodiment of the invention has been described with regard to a forked suspension, it should not be limited to such a suspension. It is envisioned that the teachings of the first embodiment of the present invention may be applied to a single membered suspension. As one with ordinary skill in the art will readily recognize, such a suspension is easily obtainable by removal of one side of the suspension, e.g., by removal of elongate member 2, sleeve 72, and lower shock absorber 42. In this situation, the clamps 10, 20 and 30 would also be shortened by removal of one set of apertures.

Where shock chambers have been indicated as preferably sealed and/or pressurized chambers, other structure such as valving, seals, pumps, accumulators, external reservoirs, etc., may be necessary to maintain pressurization as a skilled artisan should recognize.

I claim:

1. A suspension for a vehicle comprising:
a first shock tube having a first end and a second end;
a second shock tube telescopically and sealingly received in the first shock tube, the second shock tube having a first end and a second end;
a first housing telescopically and sealingly receiving the first end of the first shock tube to form a first shock chamber;
a first piston coupled to the first housing and sealingly received in the first end of the second shock tube;
an intermediate piston fixedly mounted relative to the first shock tube by an intermediate piston positioner, the intermediate piston extending into the second end of the second shock tube to form a second shock chamber with the first piston;
a second housing telescopically and sealingly receiving the second end of the first shock tube.

2. The suspension of claim 1, wherein a third shock chamber is formed between the second end of the second shock tube and the intermediate piston.

3. The suspension of claim 2, wherein a fourth shock chamber is formed between the intermediate piston positioner and the second end of the second shock tube.

4. The suspension of claim 3, wherein the second housing forms a fifth shock chamber with the second end of the first shock tube.

5. The suspension of claim 4, further comprising a second piston coupled to the second housing and sealingly received in the second end of the first shock tube to form a sixth shock chamber with the intermediate piston positioner.

6. The suspension of claim 5, wherein the sixth shock chamber is within the intermediate piston positioner.

7. The suspension of claim 5, wherein each of the first and second pistons includes a hollow stem and at least one restrictive orifice that communicates with the hollow stem.

8. The suspension of claim 7, wherein each hollow stem extends through a respective one of the first and second housings and is in fluid communication with a source of pressurized fluid.

9. The suspension of claim 7, wherein the second and sixth shock chambers, hollow stems and source of pressurized fluid are filled with an oil.

10. The suspension of claim 4, further comprising an exterior shock absorber coupling the first housing and the first shock tube.

11. The suspension of claim 10, wherein the exterior shock absorber includes a shock housing coupled to the first housing, a piston slidably received within the shock housing and a stem coupled to the first shock tube.

12. The suspension of claim 4, wherein the first, third and fourth shock chambers are pneumatically pressurized.

* * * * *